Dec. 29, 1942.   H. W. GOULDTHORPE   2,306,724
DYNAMO-ELECTRIC MACHINE
Filed March 4, 1941
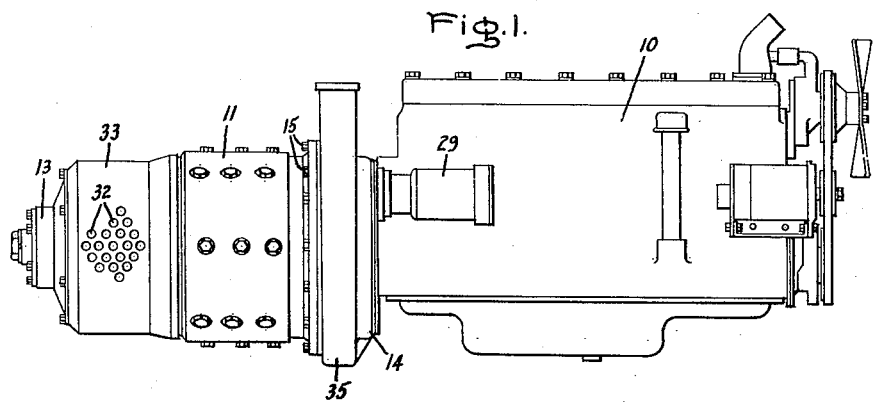
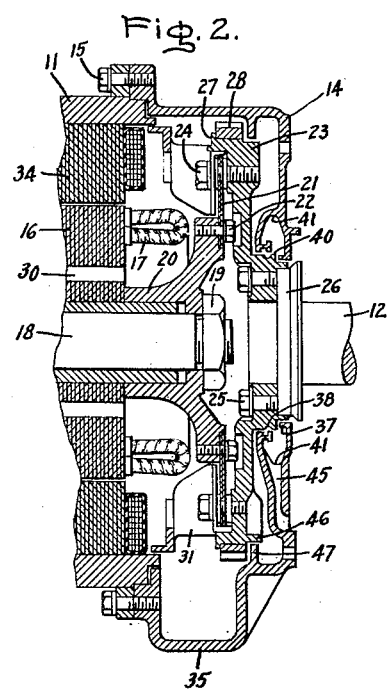
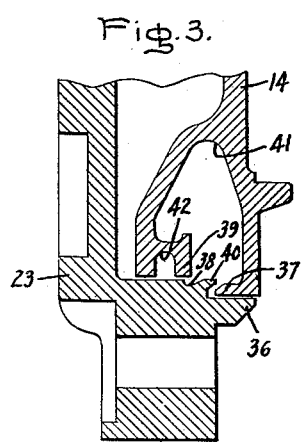
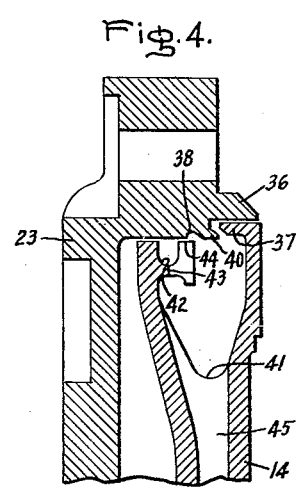
Inventor:
Hubert W. Gouldthorpe,
by Harry E. Dunham
His Attorney.

Patented Dec. 29, 1942

2,306,724

UNITED STATES PATENT OFFICE 2,306,724

DYNAMOELECTRIC MACHINE

Hubert W. Gouldthorpe, Wesleyville, Pa., assignor to General Electric Company, a corporation of New York Application March 4, 1941, Serial No. 381,681

8 Claims. (Cl. 171—252)

My invention relates to dynamo-electric machines and more particularly to an improved end shield member constructed to minimize the passage of lubricant to the windings of the machine from a shaft to which the machine is coupled.

An object of my invention is to provide an improved and simplified dynamo-electric machine having an end shield construction for minimizing the passage of lubricant to the windings of the machine from a rotatable shaft to which it is coupled.

Another object of my invention is to provide an improved shaft seal for a dynamo-electric machine for minimizing the passage of lubricant to the rotatable member from a shaft to which it is coupled.

Further objects and advantages of my invention will become apparent and my invention will be better understood from the following description referring to the accompanying drawing, and the features of novelty which characterize my invention will be pointed out with particularity in the claims annexed to and forming part of the specification.

In the drawing, Fig. 1 illustrates a power unit including an engine and a generator driven thereby embodying my invention; Fig. 2 is a sectional partial side elevational view of the generator shown in Fig. 1; Fig. 3 is an enlarged sectional partial view of the upper portion of the clearance seals formed by the end shield shown in Figs. 1 and 2; and Fig. 4 is an enlarged sectional view of the lower part of the clearance seals formed by the end shield shown in Figs. 1 and 2.

Referring to the drawing, I have shown a power unit including a prime mover or internal combustion engine 10 arranged to drive a generator or a dynamo-electric machine having a stationary member 11 and a rotatable member directly supported by and coupled to the shaft 12 of the engine and supported at the other end by a bearing in a hub 13. In this arrangement, the generator requires no bearing for the rotatable member at the end thereof adjacent the engine. The stationary member 11 is rigidly secured to the block of the engine 10 through a stationary end shield member 14 which is bolted to the block of the engine 10 and is secured to the stationary member 11 by a plurality of bolts 15.

The rotatable member of the generator is provided with a laminated core 16 and an armature winding 17 supported on a shaft 18 and secured in assembled relationship by a nut 19 which threadedly engages the end of the shaft 18 and secures an armature head 20 in engagement with the outer lamination of the core 16.

In order to make the weight and size of this power unit as small as possible, this assembly is adapted to be supported by a coupling at the end thereof adjacent the engine 10, so as to eliminate the necessity of providing a bearing at this end of the machine. The type of coupling provided is the same as that described in Aydelott Patent 2,156,957, assigned to the same assignee as this application, and includes an annular laminated coupling element 21 secured to the armature 20 by a plurality of circumferentially spaced apart bolts 22 and secured to a rotatable coupling element 23 by another plurality of circumferentially spaced apart bolts 24. The rotatable coupling element 23 is rigidly secured by a plurality of circumferentially spaced apart bolts 25 to a coupling flange 26 formed on the engine shaft 12. This coupling element 23 is formed with an annular flange 27 on which is mounted a ring gear 28 which is adapted to provide a driving connection between the engine shaft 12 and a starting motor 29. In order to provide adequate ventilation to the generator, the laminated core 16 is formed with a plurality of axially extending ventilating passages 30 which are open at each end of the rotatable member, and a ventilating medium impeller fan provided with a plurality of vanes 31 is secured by the bolts 24 to the rotatable coupling element 23 and is driven by the rotatable member of the machine. This fan arrangement is adapted to draw air into the generator through perforations 32 formed in a cover 33 over the commutator of the generator, through the axial passages 30 of the rotatable member, the air gap between the rotatable member and the stationary member and between pole pieces 34 of the stationary member 11 and to be expelled from the machine by the impeller vanes 31 through a scroll fan housing portion 35 of the end shield 14.

It is desirable in this type construction to provide a sealing arrangement to minimize the passage of lubricant from the engine 10 to the generator, as lubricating oils generally have a detrimental effect on the insulation of the windings of the generator. I provide an improved shaft seal construction which includes a plurality of clearance seals formed by flanges on the end shield element 14 and flanges on the rotatable coupling element 23. As may be seen more clearly in the enlarged views shown in Figs. 3 and 4, the rotatable element is provided with a flange 36 which cooperates with a complementary flange 37 formed on the end shield 14 to provide a clearance seal therebetween. An annular oil groove 38 is formed in the hub of the rotatable element 23 axially spaced away from the flange 36, and a clearance seal is formed between the adjacent portion of the hub and a second annular flange 39 formed on the end shield 14 axially spaced away from the flange 37. An oil flinger 40 is formed as an annular flange on the hub of the rotatable element 23 between the clearance seals provided by the end shield flanges 37 and 39. An annular lubricant collecting chamber 41 is formed in the end shield 14 between the two above-mentioned clearance seals and about the flinger 40 for collecting foreign substances thrown by centrifugal force from the rotatable element by the flinger. In order further to minimize the passage of lubricant along the rotatable member, an oil groove 42 is formed in the end shield with the flange 39 as the outer wall thereof. This oil groove is spaced away from the oil groove 38 formed in the rotatable element, and is adapted to collect oil which passes the clearance seal formed by the flange 39. The lower portion of the outer wall 39 of the oil groove 42 is cut away at 43 to provide communication between the lower portion of the oil groove and the collecting channel 41 and provides a scraping edge 44 which is adapted to remove excess lubricant adjacent the lower portion of the clearance seal formed by the flange 39. Lubricant collected in the collecting channel 41 is adapted to be drained from this channel back to the engine crankcase by a draining passage 45. A third clearance seal is provided by an annular flange 46 formed on the rotatable element 23 adjacent the outer periphery thereof and a complementary annular flange 47 formed on the end shield 14. In order further to minimize the passage of lubricant past this third clearance seal, it is arranged as near as possible to the portion 35 of the end shield which forms the fan housing, so as to be closely adjacent the fan 31 to provide a positive increase in gas pressure at this part of the end shield adjacent this seal to minimize the passage of lubricant in a direction towards the interior of the generator.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. In a dynamo-electric machine having a stationary member and a rotatable member, a rotatable element coupled to said rotatable member, a stationary end shield element secured to said stationary member and providing a clearance seal with said rotatable element, a second clearance seal between said end shield and said rotatable element, and means including a fan adjacent said second seal and driven by said rotatable member for providing a positive increase in the gas pressure in said end shield adjacent said second clearance seal to minimize passage of lubricant past said second clearance seal.

2. In a dynamo-electric machine having a stationary member and a rotatable member, a fan mounted on said rotatable member, a rotatable element having a flange thereon and connected to said rotatable member adjacent said fan, a stationary end shield element secured to said stationary member and having a complementary flange adjacent said rotatable element flange providing a clearance seal with said rotatable element, an oil groove on said rotatable element axially spaced away from said first-mentioned flange, a second flange on said end shield adjacent said rotatable element oil groove providing a second clearance seal, a flinger on said rotatable element, and means including a collecting channel in said end shield between said clearance seals and about said flinger for collecting foreign substances thrown therein from said rotatable element by said flinger.

3. In a dynamo-electric machine having a stationary member and a rotatable member, a rotatable element coupled to said rotatable member and having a flange thereon, a stationary end shield element secured to said stationary member and having a complementary flange adjacent said rotatable element flange providing a clearance seal with said rotatable element, a flinger on said rotatable element, means including a collecting channel in said end shield about said flinger for collecting foreign substances thrown from said rotatable element by said flinger, a second flange on said rotatable element, a second flange on said end shield providing a second clearance seal with said rotatable element, and means including a fan adjacent said second seal for providing a positive increase in the gas pressure in said end shield adjacent said second clearance seal to minimize the passage of lubricant past said second clearance seal.

4. In a dynamo-electric machine having a stationary member and a rotatable member, a fan mounted on said rotatable member adjacent an end thereof, a rotatable element, means for coupling said rotatable element with said rotatable member, a stationary end shield element secured to said stationary member and forming an exhaust ventilating medium housing about said fan, said end shield having a clearance seal with said rotatable element adjacent said fan, a second clearance seal formed between said rotatable element and said end shield axially spaced away from said first-mentioned seal, means including a collecting channel in said end shield between said clearance seals for collecting foreign substances thrown thereinto from said rotatable element, a flange on said rotatable element, and a cooperating flange on said end shield providing a third clearance seal adjacent said fan housing.

5. In a dynamo-electric machine having a stationary member and a rotatable member, a rotatable element coupled to said rotatable member and having a flange thereon, a stationary end shield element secured to said stationary member and having a complementary flange adjacent said rotatable element flange providing a clearance seal with said rotatable element, a second clearance seal between said rotatable element and said end shield axially spaced away from said first-mentioned seal, means including a collecting channel in said end shield between said clearance seals for collecting foreign substances thrown therein from said rotatable element, a second flange on said rotatable element, a second complementary flange on said end shield providing a third clearance seal with said rotatable element, and means including a fan adjacent said second seal for providing a positive increase in the gas pressure in said end shield adjacent said third clearance seal to minimize passage of lubricant past said third clearance seal.

6. In a dynamo-electric machine having a stationary member and a rotatable member, a fan mounted on said rotatable member, a rotatable element coupled to said rotatable member and having a flange thereon, a stationary end shield element secured to said stationary member and forming an exhaust ventilating medium housing about said fan, said end shield having a complementary flange adjacent said rotatable element flange providing a clearance seal therewith adjacent said fan, an oil groove on said rotatable element axially spaced away from said first-mentioned flange, a second flange on said end shield adjacent said rotatable element oil groove providing a second clearance seal, means including a collecting channel in said end shield between said clearance seals for collecting foreign substances thrown therein from said rotatable element, a second flange on said rotatable element, and a third flange on said end shield providing a third clearance seal with said second rotatable element flange.

7. In a dynamo-electric machine having a stationary member and a rotatable member, a rotatable element rotatable with said rotatable member and having a flange thereon, a stationary end shield element secured to said stationary member and having a complementary flange adjacent said rotatable element flange providing a clearance seal with said rotatable element, an oil groove on said rotatable element axially spaced away from said first-mentioned flange, a second flange on said end shield adjacent said rotatable element oil groove providing a second clearance seal, a flinger on said rotatable element, means including a collecting channel in said end shield between said clearance seals and about said flinger for collecting foreign substances thrown from said rotatable element by said flinger, a second flange on said rotatable element, a third flange on said end shield providing a third clearance seal with said rotatable element, and means including a fan adjacent said second seal for providing a positive increase in the gas pressure in said end shield adjacent said third clearance seal to minimize the passage of lubricant past said third clearance seal.

8. A shaft seal comprising a rotatable element having a flange, a stationary element having a complementary flange adjacent said rotatable element flange providing a clearance seal, an oil groove on said rotatable element axially spaced away from said first-mentioned flange, a second flange on said stationary element adjacent said rotatable element oil groove providing a second clearance seal, a flinger on said rotatable element, means including a collecting channel in said stationary element between said clearance seals and about said flinger for collecting foreign substances thrown from said rotatable element by said flinger, an oil groove in said stationary element having said second stationary element flange as the outer wall thereof and being axially spaced away from said rotatable element oil groove, and means including an axially extending opening in the lower portion of the outer wall of said stationary member oil groove adjacent said collecting channel to provide a scraping edge for removal of excess oil from said rotatable element.

HUBERT W. GOULDTHORPE.